United States Patent [19]

Bolger

[11] Patent Number: 4,573,075
[45] Date of Patent: Feb. 25, 1986

[54] DIGITAL SIGNAL CORING APPARATUS WITH CONTROLLABLE CORING THRESHOLD LEVEL

[75] Inventor: Thomas V. Bolger, Merchantville, N.J.

[73] Assignee: RCA Corporation, Princeton, N.J.

[21] Appl. No.: 507,555

[22] Filed: Jun. 24, 1983

[51] Int. Cl.$^4$ .................. H04N 5/21; H04N 5/14
[52] U.S. Cl. ..................... 358/167; 358/36; 358/318; 307/358
[58] Field of Search .......... 358/160, 166, 167, 36, 358/37, 39, 315, 316, 318; 375/76, 104; 307/350, 358

[56] References Cited

U.S. PATENT DOCUMENTS

| 3,333,055 | 7/1967 | Krause | 178/6 |
|---|---|---|---|
| 3,602,737 | 8/1971 | Radecke | 307/231 |
| 3,715,477 | 2/1973 | Olsen et al. | 178/5.4 R |
| 3,979,683 | 9/1976 | Ikeda | 328/165 |
| 4,009,334 | 2/1977 | Sypula | 358/178 |
| 4,167,749 | 9/1979 | Burrus | 358/8 |
| 4,268,864 | 5/1981 | Green | 358/166 |
| 4,358,788 | 11/1982 | Burrowes | 358/39 |
| 4,437,123 | 3/1984 | Harlan | 358/167 |
| 4,437,124 | 3/1984 | Cochran | 358/166 |

FOREIGN PATENT DOCUMENTS 2059203A 4/1981 United Kingdom .

OTHER PUBLICATIONS

J. Rossi, "Digital Television Image Enhancement", *SMPTE Journal*, vol. 84, Jul. 1975, pp. 545–551.
J. Rossi, "Digital Techniques for Reducing Television Noise", *SMPTE Journal*, vol. 87, Mar. 1978, pp. 134–140.

*Primary Examiner*—Tommy P. Chin
*Attorney, Agent, or Firm*—Eugene M. Whitacre; Paul J. Rasmussen; Clement A. Berard, Jr.

[57] ABSTRACT

A digital signal processing apparatus includes a digital coring circuit removing samples of digital input signals in a range determined by a digital threshold level signal. The threshold level signal developed by a coring control device is controllable according to the results of comparing at least a portion of the digital input signals to a digital reference level. In a television receiver having digital signal processing circuitry, for example, the coring range is decreased as the luminance signal level increases towards a brighter picture level and is increased as the luminance signal level decreases towards a darker picture level.

20 Claims, 6 Drawing Figures

DIGITAL SIGNAL CORING APPARATUS WITH CONTROLLABLE CORING THRESHOLD LEVEL

The present invention relates to digital signal processing apparatus and, in particular, to a digital signal coring apparatus providing a coring threshold controllable in response to at least a portion of the digital signal to be cored. The present invention is useful in processing digital television signals in a television receiver.

BACKGROUND OF THE INVENTION

Coring is a signal processing operation in which low-level signal variations, often associated with noise, are removed from a signal to improve its signal-to-noise ratio. For television (TV) signals, for example, noise can be introduced by the transmission path, the RF tuner and amplifiers, the IF amplifiers or external noise sources. Fixed threshold coring, in which low-level signal variations not exceeding a fixed threshold level are removed, is inadequate in a TV receiver because the viewer is more perceptive of noise occurring in a dark scene (i.e. light spots in a dark background) than in a light scene (i.e. dark spots in a light background).

Thus, it is desirable to provide a relatively higher coring threshold for low luminance signal levels (darker scenes) and a relatively lower coring threshold for high luminance signal levels (lighter scenes). An analog circuit arrangement providing this desirable characteristic for TV receivers having analog signal processing is described in U.S. patent application Ser. No. 373,750 entitled DYNAMIC CORING CIRCUIT filed on Apr. 30, 1982 by L. A. Cochran, (now U.S. Pat. No. 4,437,124) which is assigned to the same assignee as is the present invention.

In digital signal processing apparatus, however, a digital signal coring apparatus must perform the coring operation on signals which are digital numbers representing signal levels rather than directly upon the signal levels per se. Thus, digital circuitry must be employed to generate a coring threshold signal, to develop a control signal therefrom under certain conditions, and to develop cored digital signals in response to the control signal.

SUMMARY OF THE INVENTION

Accordingly, the digital signal processing apparatus of the present invention comprises a control device developing digital threshold signals controllable in response to digital input signals, a comparator device comparing the digital input signals and the digital threshold signals to develop a gating signal, and a gating device producing digital output signals in response to the digital input signals and the gating signal.

DETAILED DESCRIPTION

Figure 1:
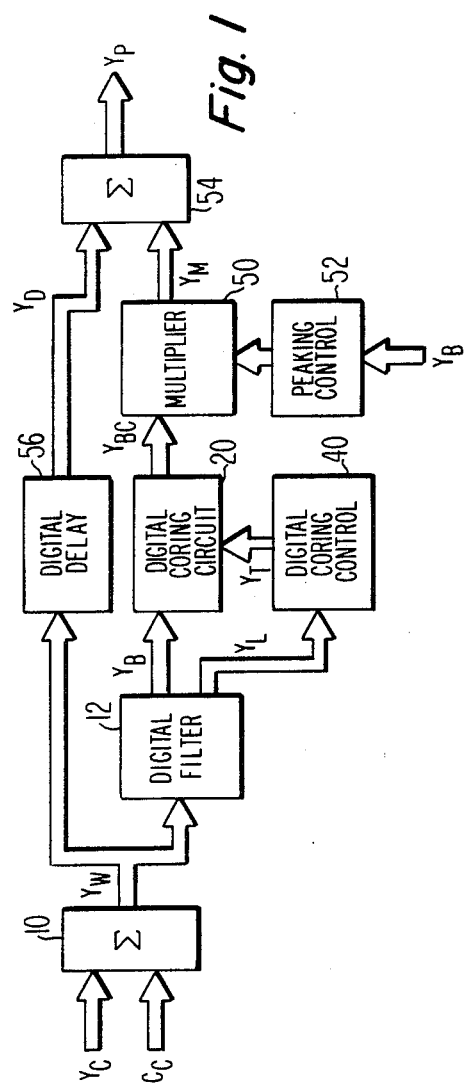
FIG. 1 is a schematic diagram in block diagram form of digital signal processing apparatus including an exemplary embodiment of the present invention.

In the drawing, broad arrows represent signal paths for multiple-bit parallel digital signals and line arrows represent signal paths for single-bit or serial digital signals.

FIG. 1 illustrates a portion of a digital signal processing section of a TV receiver in which luminance signals are processed digitally. Although the present invention is one of general applicability, it is described herein in the environment of a digital luminance signal processor section of a TV receiver because the digital coring operation controllable in response to adjustable digital threshold signals is advantageously practiced therein.

Figure 2:
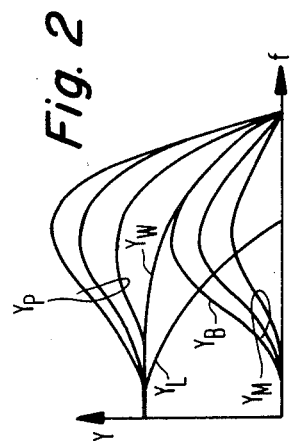
FIGS. 2 and 4 are graphs of transfer characteristics useful in understanding the apparatus of FIG. 1.

Digital adder 10 is a source of wideband digital luminance signals $Y_W$ which it develops by adding vertical detail information included in comb-filtered digital chrominance signals $C_C$ to comb-filtered digital luminance signals $Y_C$. The magnitude of digital luminance signals Y as a function of frequency f is illustrated in FIG. 2, in which the wideband digital luminance signal $Y_W$ is correspondingly identified.

Digital filter 12 of FIG. 1 receives wideband digital luminance signals $Y_W$ and develops low-pass filtered digital luminance signals $Y_L$ including the relatively lower frequency components of signals $Y_W$ and develops band-pass filtered digital luminance signals $Y_B$ including the relatively higher frequency components. Filtered digital luminance signals $Y_L$ and $Y_B$ are preferably substantially complementary in frequency spectrum magnitude as illustrated by curves $Y_L$ and $Y_B$ of FIG. 2.

Figure 3:
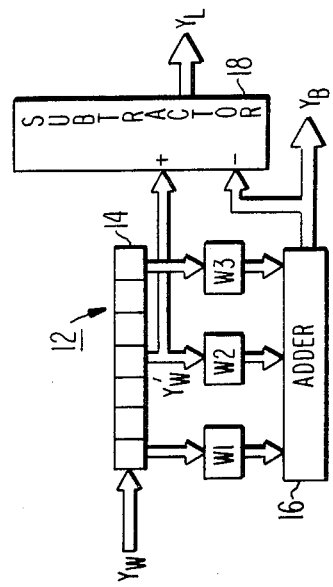
FIGS. 3, 5 and 6 are schematic diagrams partially in block diagram form of exemplary embodiments of portions of the apparatus of FIG. 1.

An exemplary embodiment of digital filter 12 shown in FIG. 3 includes plural-stage shift register 14 which produces delayed replicas of wideband digital luminance signals $Y_W$ at its various output taps in response to input signals $Y_W$ and a clocking signal (not shown). The delayed digital luminance signals produced at the taps of shift register 14 are weighted by digital weighting circuits W1, W2 and W3 which are, for example, digital multipliers. The values of the weighting coefficients of weighting circuits W1, W2 and W3 determine the frequency response of digital filter 12 as is known to those skilled in the art.

Digital adder 16 sums the weighted delayed luminance signals to develop band-pass filtered digital luminance signals $Y_B$. An output tap at the central stage of shift register 14 produces delayed wideband digital luminance signals $Y_W'$ from which band-pass filtered digital luminance signals $Y_B$ are subtracted by subtractor 18 to develop low-pass filtered digital luminance signals $Y_L$. In this manner, signals $Y_B$ and $Y_L$ are substantially complementary.

Digital coring control 40 of FIG. 1 develops digital threshold signals $Y_T$ having magnitudes controllable in response to low-pass filtered digital luminance signals $Y_L$. First consider that the levels of digital luminance signals $Y_L$ are relatively high, corresponding to a bright picture, so that digital threshold signals $Y_T$ are at a relatively low value $Y_{TW}$. Digital coring circuit 20 responds to digital threshold signals $Y_{TW}$ to produce band-pass filtered digital luminance signals $Y_B$ as cored digital luminance signals $Y_{BC}$ when the magnitude of signals $Y_B$ exceed that of digital threshold signals $Y_{TW}$. The transfer characteristic 120-124-122-126-128 of signals $Y_B$ to signals $Y_{BC}$ shown in FIG. 4 includes portions 120,128 illustrating this condition. When the magnitude of signals $Y_B$ is less than that of $Y_{TW}$, digitally zero signals are produced as cored digital luminance signals $Y_{BC}$ as illustrated by portion 122 of FIG. 4.

Figure 4:
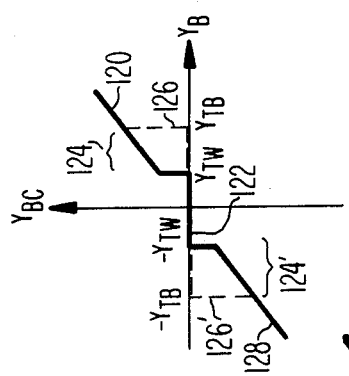

Next, consider that the levels of digital luminance signals $Y_L$ are relatively low, corresponding to a dark picture, so that digital threshold signals $Y_T$ developed by coring control 40 are at a relatively high value $Y_{TB}$. Digital coring circuit 20 exhibits transfer characteristic 120-124'-122-126'-128 shown in FIG. 4 representing coring of signals $Y_B$ over a relatively increased coring range (i.e. $-Y_{TB}$ to $+Y_{TB}$) to develop cored digital signals $Y_{BC}$.

Figure 5:
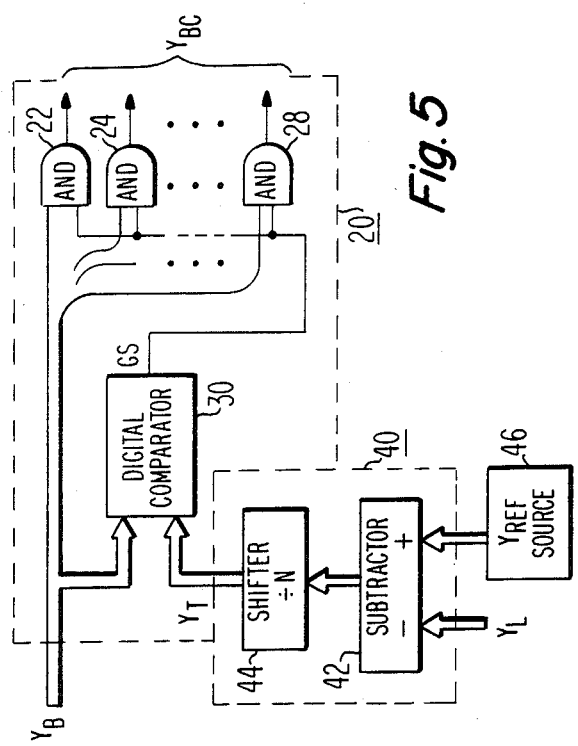

Exemplary apparatus comprising digital coring control 40 and digital coring circuit 20 are shown in FIG. 5, for example. Coring control 40 includes digital subtractor 42 which produces difference signals between the magnitudes of low-pass filtered digital luminance signal $Y_L$ and that of digital reference signal $Y_{REF}$ supplied by reference source 46. The magnitude of $Y_{REF}$ is, for example, approximately that corresponding to a bright (white) picture level of luminance signals $Y_L$. Thus, for bright (white) picture conditions, the difference signal magnitude approaches zero and for dark (black) picture conditions approaches 100% of $Y_L$ magnitude. Digital shifter 44 divides the difference signal by a number N to develop threshold signal $Y_T$. Convenient numbers N are even powers of two, i.e. 2, 4, 8, 16 and so forth. Mathematically, control circuit 40 of FIG. 5 controllably develops digital threshold signal $Y_T$ in accordance with the equation:

$$Y_T = (1/N)[Y_{REF} - Y_L]. \tag{1}$$

It is preferred to select the reference level $Y_{REF}$ to be approximately the 100% (full) bright picture luminance level and the division factor to be eight. This produces a controllable coring threshold level which changes between a minimum of 0% for bright pictures and a maximum of $12\frac{1}{2}\%$ for dark pictures. These levels substantially correspond to the approximately 0% to 10% coring threshold range found to be satisfactory in analog TV receivers and permit digital control circuit 40 to be advantageously simple.

Digital coring circuit 20 of FIG. 5 includes digital comparator 30 which compares band-pass filtered digital luminance signals $Y_B$ to the digital threshold signals $Y_T$ to develop gating signal GS. Coring circuit 20 further includes a plurality of AND gates 22, 24 ... 28 each of which receives one bit of digital signal $Y_B$ at a first input. The second inputs of AND gates 22, 24 ... 28 receive gating signal GS. When the magnitude of $Y_B$ exceeds that of $Y_T$, comparator 30 develops gating signal GS at a high digital level to enable AND gates 22, 24 ... 28 to pass signal $Y_B$ as cored band-pass filtered digital luminance signal $Y_{BC}$; otherwise comparator 30 develops GS to disable AND gates 22, 24 ... 28 which thereby develop signal $Y_{BC}$ having the predetermined magnitude of zero (i.e. all bits are zero).

Figure 6:
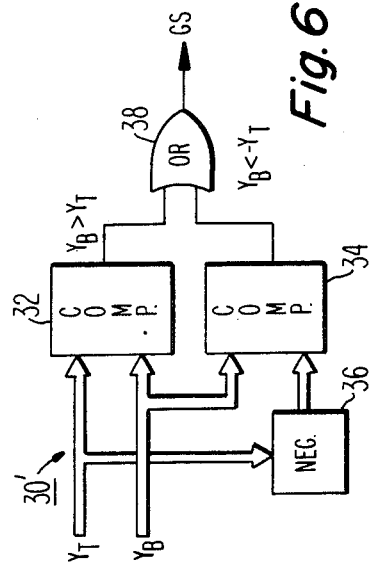

An exemplary embodiment of digital comparator 30 is digital window comparator 30' shown in FIG. 6. If the magnitude of digital signals $Y_B$ exceeds that of threshold digital signals $Y_T$ in the positive polarity sense, then comparator 32 develops an enabling level output signal which is supplied via OR gate 38 as gating signal GS. Negativing circuit 36 converts $Y_T$ into negatively valued digital threshold signal $-Y_T$ which is applied to digital comparator 34. If the magnitude of $Y_B$ is more negative than that of $-Y_T$, then comparator 34 develops an enabling level output signal which is supplied via OR gate 38 as gating signal GS. When $Y_B$ is between or equal to the magnitudes $Y_T$ and $-Y_T$, neither of comparators 32 and 34 develop an enabling level output signal and gating signal GS disables AND gates 22, 24 ... 28 as described above.

Peaking control circuit 52 of FIG. 1 is responsive, for example, to band-pass filtered digital luminance signals $Y_B$ to develop a multiplying coefficient which is applied to peaking multiplier 50. Multiplier 50 multiplies the cored digital signals $Y_{BC}$ by this coefficient to develop multiplied digital luminance signals $Y_M$ having the characteristics shown in FIG. 2 by the family of curves labelled $Y_M$. Reference is made to U.S. patent application Ser. No. 507,544 entitled DIGITAL SIGNAL PEAKING APPARATUS WITH CONTROLLABLE PEAKING LEVEL filed on even date herewith wherein peaking control 52 is further described.

Wideband digital luminance signals $Y_W$ are delayed in time by digital delay circuit 56 which develops delayed digital luminance signals $Y_D$. Delay circuit 56 is, for example, a shift register having a number of stages selected to provide a time delay substantially equal to that occurring in the development of multiplied digital luminance signals $Y_M$ in response to wideband digital luminance signals $Y_W$ via the path 12, 20, 50.

Digital adder 54 combines delayed wideband digital luminance signals $Y_D$ and multiplied, controllably cored digital luminance signals $Y_M$ to develop peaked luminance signals $Y_P$. FIG. 2 further illustrates a family of magnitude vs. frequency characteristics of peaked digital luminance signals $Y_P$ which are the sums of respective ones of the family of characteristics $Y_M$ and the characteristic of $Y_W$ (which is representative of $Y_D$).

It is noted that the multiplication coefficient developed by peaking conrol 52 can be sufficiently small that the signals $Y_M$ are insignificant in magnitude relative to the wideband digital luminance signals $Y_W$, $Y_D$. In this condition, the luminance signals $Y_P$ are "unpeaked".

Exemplary signal levels in a TV receiver having an eight-bit (256 level) analog-to-digital converter (ADC) digitizing composite video signals are as follows. Digital levels herein are expressed as the decimal equivalents of binary numbers. Consider that the digital level "0" corresponds to the tip of the synchronizing pulse at $-40$ IRE units amplitude and the digital level "256" corresponds to a level beyond full-white at a $+120$ IRE unit amplitude of the composite video signals. Then the black level (0 IRE units) and the white level (100 IRE units) correspond to digital levels "64" and "224", respectively. The digital reference level is selected to be "224" and N is selected to be eight. In this arrangement, control circuit 40 develops a coring threshold level for a substantially white picture which is:

$$Y_{TW} = (\tfrac{1}{8})[224 - 224] = 0 \tag{2}$$

in accordance with equation (1) above. Similarly, the coring threshold level for a substantially black picture is:

$$Y_{TB} = (\tfrac{1}{8})[224 - 64] = 160/8 = 20. \tag{3}$$

It is important to note that the coring operation of the present invention does not affect the basic picture information and detail which is represented in the wideband digital luminance signals $Y_W, Y_D$. Coring merely prevents increasing the relatively lower-level, higher frequency signal components thereof as would otherwise occur due to the peaking circuit arrangement in which the present invention is employed. More importantly, emphasis of these higher frequency signal components is reduced to a greater degree by the present invention for relatively darker pictures in which noise is more evident to a viewer than for relatively lighter pictures in which noise is less evident.

What is claimed is:

1. Digital signal processing apparatus comprising:

a first source for providing digital input signals to be processed;

digital filtering means coupled to said first source for developing first and second digital signals respectively including relatively higher and relatively lower frequency components of said digital input signals;

digital control means coupled to said digital filtering means for developing digital threshold signals controllable in response to said second digital signals; and digital processing means, for producing output signals at an output terminal thereof, including:

comparing means coupled to said digital filtering means and to said digital control means for comparing said first digital signals and said digital threshold signals; and means responsive to said comparing means for selectively coupling said first digital signals from said digital filter means to said output terminal when said first digital signal exceeds said digital threshold signals developed by said digital control means.

2. The apparatus of claim 1 wherein said digital filtering means comprises:

delaying means for producing successively delayed samples of said digital input signals at successive taps thereof;

a plurality of weighting circuits coupled to ones of said taps for weighting said successively delayed samples;

first digital combining means coupled to said plurality of weighting circuits for combining the weighted digital samples produced thereby to form said first digital signals; and second digital combining means coupled to said first digital combining means and to said delaying means for subtractively combining said first digital signals and the delayed sample produced at a predetermined one of said taps to form said second digital signals.

3. The apparatus of claim 1 wherein said digital control means comprises:

a second source for providing a digital reference signal;

second comparing means for producing said digital threshold signals in response to the relative magnitudes of said second digital signals and said digital reference signal.

4. The apparatus of claim 3 wherein said second comparing means includes means for producing said digital threshold signals in response to the difference between the magnitudes of said second digital signals and said digital reference signal.

5. The apparatus of claim 4 wherein said means for producing includes means for dividing said difference between the magnitudes by a constant number.

6. The apparatus of claim 5 wherein said means for dividing includes a digital shifter, said constant number being $2^N$ where N is a positive integer.

7. The apparatus of claim 1 further comprising:

delaying means coupled to said first source for delaying said digital input signals;

combining means, coupled to said digital processing means and to said delaying means, for combining said output signals produced by said digital processing means and said delayed digital input signals provided by said delaying means to develop processed digital signals therefrom.

8. The apparatus of claim 7 further comprising digital scaling means, coupled between said digital processing means and said combining means, for scaling the magnitude of said output signals produced by said digital processing means.

9. Digital signal processing apparatus comprising:

a signal source for providing digital input signals to be processed;

a reference source for providing a digital reference signal;

digital control means, coupled to said signal source and to said reference source, for developing digital threshold signals in response to said digital input signals and to said digital reference signal;

digital comparing means, coupled to said signal source and to said digital control means, for comparing said digital input signals and said digital threshold signals to develop a gating control signal; and digital gating means, coupled to said signal source and to said digital comparing means, for selectively providing said digital input signals as output digital signals in response to said gating control signal.

10. The apparatus of claim 9 wherein said digital control means includes second comparing means for developing said digital threshold signals in response to the difference of the magnitudes of said digital input signals and said digital reference signal.

11. The apparatus of claim 10 wherein said digital control means further includes means for dividing said difference of the magnitudes by a constant number to develop said digital threshold signals.

12. The apparatus of claim 11 wherein said means for dividing includes a digital shifter, said constant number being $2^N$ where N is a postiive integer.

13. The apparatus of claim 9 further comprising:

delaying means coupled to said signal source for delaying said digital input signals;

combining means, coupled to said digital gating means and to said delaying means, for combining said output signals produced by said digital gating means and said delayed digital input signals provided by said delaying means to develop processed digital signals therefrom.

14. The apparatus of claim 13 further comprising digital scaling means, coupled between said digital gating means and said combining means, for scaling the magnitude of said output signals produced by said digital gating means.

15. The apparatus of claim 9 wherein said digital control means includes a digital filter coupled to said signal source for low-pass filtering said digital input signals, and wherein said digital threshold signals are developed in response to said filtered digital input signals and to said digital reference signal.

16. The apparatus of claim 15 wherein said digital control means includes second comparing means for developing said digital threshold signals in response to the difference of the magnitudes of said filtered digital input signals and said digital reference signal.

17. The apparatus of claim 16 wherein said digital control means further includes means for dividing said difference of the magnitudes by a constant number to develop said digital threshold signals.

18. The apparatus of claim 17 wherein said means for dividing includes a digital shifter, said constant number being $2^N$ where N is a positive integer.

19. Digital signal coring apparatus having an controllable coring threshold level comprising:

a signal source for providing digital input signals upon which coring is to be performed;

a digital filter coupled to said signal source for developing first and second filtered digital signals respectively including relatively higher and relatively lower frequency components of said digital input signals;

a reference source for providing a digital reference level signal;

first comparing means, coupled to said digital filter and to said reference source, for developing digital difference signals responsive to the difference between the magnitudes of said second filtered digital signals and said digital reference level signal;

shifter means coupled to said first comparing means for scaling said digital difference signals to develop digital threshold signals therefrom, whereby said digital threshold signals have magnitudes controllable responsive to said digital input signals;

second and third comparing means, coupled to said digital filter and to said shifting means, said second comparing means developing a first control signal in response to the magnitude of said first filtered digital signals exceeding that of said digital threshold signals in a first polarity sense, and said third comparing means developing a second control signal in response to the magnitude of said first filtered digital signals exceeding the negative of the magnitude of said digital threshold signals in a second polarity sense opposite to said first polarity sense;

control means coupled to said second and third comparing means for developing a gating control signal in response to said first and second control signals; and gating means, coupled to said digital filter and to said control means and including a plurality of AND gates having first and second input connections, for developing cored digital signals responsive to respective bits of said first filtered digital signals applied to corresponding ones of said first input connections of said AND gates and to said gating control signal applied to said second input connections thereof.

20. The apparatus of claim 19 further comprising:

delaying means coupled to said signal source for delaying said digital input signals;

digital scaling means, coupled to said gating means, for scaling the magnitude of said cored digital signals produced by said gating means; and combining means, coupled to said digital scaling means and to said delaying means, for combining said scaled cored digital signals produced by said digital scaling means and said delayed digital input signals produced by said delaying means to develop processed digital signals therefrom.

* * * * *